(12) United States Patent
Marshall

(10) Patent No.: US 8,629,801 B2
(45) Date of Patent: Jan. 14, 2014

(54) EVENT LOCATION DETERMINATION

(75) Inventor: Chris Marshall, Sussex (GB)

(73) Assignee: U-Blox A.G., Thalwil (CH)

( * ) Notice: Subject to any disclaimer, the term of this patent is extended or adjusted under 35 U.S.C. 154(b) by 174 days.

(21) Appl. No.: 13/140,393

(22) PCT Filed: Dec. 3, 2009

(86) PCT No.: PCT/EP2009/066370
§ 371 (c)(1),
(2), (4) Date: Jun. 16, 2011

(87) PCT Pub. No.: WO2010/072540
PCT Pub. Date: Jul. 1, 2010

(65) Prior Publication Data
US 2011/0248886 A1 Oct. 13, 2011

(30) Foreign Application Priority Data

Dec. 22, 2008 (GB) .................................. 0823288.6

(51) Int. Cl.
*G01S 19/42* (2010.01)
*G01S 19/09* (2010.01)

(52) U.S. Cl.
USPC ................................ 342/357.25; 342/357.46

(58) Field of Classification Search
USPC ............. 342/357.21, 357.25, 357.46, 357.75; 701/468, 469
See application file for complete search history.

(56) References Cited

U.S. PATENT DOCUMENTS

| 6,016,119 A | 1/2000 | Krasner |
| 6,298,229 B1 | 10/2001 | Tomlinson, Jr. et al. |
| 2001/0017599 A1 | 8/2001 | Yule et al. |
| 2006/0208943 A1 | 9/2006 | Gronemeyer |
| 2008/0218401 A1 | 9/2008 | Loomis et al. |

FOREIGN PATENT DOCUMENTS

| JP | 2008-216752 A | 9/2008 |
| WO | WO 2007/034419 A | 3/2007 |

*Primary Examiner* — Dao Phan
(74) *Attorney, Agent, or Firm* — Blakely Sokoloff Taylor & Zafman

(57) ABSTRACT

A method of determining a location of an event of interest by processing signals from a satellite positioning system comprises periodically recording blocks of data samples of a satellite broadcast. In response to a request for a position determination at a particular time, a most recent block of data samples is processed in an attempt to obtain a position fix. If unsuccessful, the method further comprises processing blocks of data samples which were recorded further back in time in a sequence to make further attempts to obtain a position fix, until a position fix is obtained. The blocks of data samples used for the further attempts are irregularly spaced in time, for example more densely populated in relatively recent time than in relatively ancient time with respect to the particular time. This enables the processing resource in attempting to obtain a position fix to be allocated efficiently, thereby reducing power consumption.

18 Claims, 2 Drawing Sheets

EVENT LOCATION DETERMINATION

This is a non-provisional application claiming the benefit of International Application Number PCT/EP2009/066370 filed Dec. 3, 2009

BACKGROUND OF THE INVENTION

1. Field of the Invention

This invention relates to methods of determining the location of an event of interest in conjunction with a satellite positioning system, such as GPS.

2. Description of Related Art

The global positioning system is a satellite-based navigation system consisting of a network of up to 32 orbiting satellites (called space vehicles, "SV") that are in six different orbital planes. 24 satellites are required by the system design, but more satellites provide improved coverage. The satellites are constantly moving, making two complete orbits around the Earth in just under 24 hours.

The GPS signals transmitted by the satellites are of a form commonly known as Direct Sequence Spread Spectrum employing a pseudo-random code which is repeated continuously in a regular manner. The satellites broadcast several signals with different spreading codes including the Coarse/Acquisition or C/A code, which is freely available to the public, and the restricted Precise code, or P-code, usually reserved for military applications. The C/A code is a 1,023 bit long pseudo-random code broadcast with a chipping rate of 1.023 MHz, repeating every millisecond. Each satellite sends a distinct C/A code, which allows it to be uniquely identified.

A data message is modulated on top of the C/A code by each satellite and contains important information such as detailed orbital parameters of the transmitting satellite (called ephemeris), information on errors in the satellite's clock, status of the satellite (healthy or unhealthy), current date, and time. This part of the signal is essential to a GPS receiver determining an accurate position. Each satellite only transmits ephemeris and detailed clock correction parameters for itself and therefore an unaided GPS receiver must process the appropriate parts of the data message of each satellite it wants to use in a position calculation.

The data message also contains the so called almanac, which comprises less accurate information about all the other satellites and is updated less frequently. The almanac data allows a GPS receiver to estimate where each GPS satellite should be at any time throughout the day so that the receiver can choose which satellites to search for more efficiently. Each satellite transmits almanac data showing the orbital information for every satellite in the system.

A conventional GPS receiver reads the transmitted data message and saves the ephemeris, almanac and other data for continual use. This information can also be used to set (or correct) the clock within the GPS receiver.

To determine position, a GPS receiver compares the time a signal was transmitted by a satellite with the time it was received by the GPS receiver. The time difference tells the GPS receiver how far away that particular satellite is. By combining distance measurements from multiple satellites, position can be obtained by trilateration. With a minimum of three satellites, a GPS receiver can determine a latitude/longitude position (a 2D position fix). With four or more satellites, a GPS receiver can determine a 3D position which includes latitude, longitude, and altitude. The information received from the satellites can also be used to set (or correct) the clock within the GPS receiver.

By processing the apparent Doppler shifts of the signals from the satellites, a GPS receiver can also accurately provide speed and direction of travel (referred to as 'ground speed' and 'ground track').

Nearly all current GPS receivers work by processing signals from the satellites in "real time", as they come in, reporting the position of the device at the current time. Such "conventional" GPS receivers invariably comprise:

- an antenna suitable for receiving the GPS signals,
- analogue RF circuitry (often called a GPS front end) designed to amplify, filter, and mix down to an intermediate frequency (IF) the desired signals so they can be passed through an appropriate analogue-to-digital (A/D) convertor at a sample rate normally of the order of a few MHz,
- digital signal processing hardware that carries out the correlation process on the IF data samples generated by the ND converter, normally combined with some form of micro controller that carries out the "higher level" processing necessary to control the signal processing hardware and calculate the desired position fixes.

The less well known concept of "Capture and Process Later" has also been investigated. This involves storing the IF data samples collected by a conventional antenna and analogue RF circuitry in some form of memory before processing them at some later time (seconds, minutes, hours or even days) and often at some other location, where processing resources are greater.

The key advantages of the Store and Process Later approach over conventional GPS receivers are that the cost and power consumption of the capturing device are kept to a minimum as no digital signal processing needs be done at the time of capture, and the captures can be very short (e.g. 100 ms). If the subsequent signal processing is done when the relevant satellite data (ephemeris etc) can be obtained via some other method, this approach also removes the need to decode the (very slow) data message from the SVs in the capturing device, which in many cases leads to unacceptably long times to start up conventional devices.

One problem with GPS systems in the case of battery-operated portable devices is that they can drain power, and thus give rise to a short battery life.

Another more general problem is that at times the GPS environment may be difficult, for example indoors or in an "urban canyon" between high rise buildings, so that it may not be possible to do a location fix using GPS. The sensitivity of GPS can be improved which can help this problem, but does not solve it completely, as there will always be situations in which there are insufficient satellite signals. Increased sensitivity also increases power consumption and cost, due to the extra computation and processing performed.

Tracking solutions provide a way forward, as a position found outdoors can then be tracked into and through difficult environments. The sensitivity can be substantially improved by this means, often giving good performance. The "last known position" can also be reported. However a tracking system consumes power consumption continually, even if actually the results are not used—the track must be maintained in case it is required later.

BRIEF SUMMARY OF THE INVENTION

According to an aspect of the current invention, there is provided a method of determining a location of an event of interest by processing signals from a satellite positioning system, the method comprising:

periodically recording blocks of data samples of a satellite broadcast;

in response to a request for a position determination at a particular time, processing a most recent block of data samples in an attempt to obtain a position fix, wherein if the attempt to obtain a position fix is unsuccessful, the method further comprises processing blocks of data samples which were recorded further back in time in a sequence to make further attempts to obtain a position fix, until a position fix is obtained, wherein the blocks of data samples used for the further attempts relate to time instants which are irregularly spaced before the particular time.

This method records captures periodically, for example with even spacing. The most recent block of samples (with respect to a request for position) is used to attempt to obtain a position fix. If this is not successful, earlier captures are used, but these are spaced irregularly back in time. This enables the processing resource in attempting to obtain a position fix to be allocated efficiently, thereby reducing power consumption. This applies if the device that records the captures is the same device that carries out the processing or if different devices are provided for the two functions.

The invention can be provided in addition to normal GPS capability, and provides the capture and store of a log of blocks of samples of GPS signals at other times. If the requested position fix is not successful then recent block of samples are used to establish a last known position.

Preferably, the blocks of data samples used for the further attempts are more densely populated in relatively recent time than in relatively ancient time with respect to the particular time.

The recording blocks of data samples can comprise writing blocks of data samples to a memory until it is full, and then overwriting selected blocks of data samples, such that the stored blocks of data samples are more densely populated in relatively recent time than in relatively ancient time. Thus, the irregular capture pattern is defined in the memory.

Alternatively, the processing of blocks of data to make further attempts can involve the selection of suitable blocks of data samples for processing (rather than writing blocks to memory in a particular way). The selected blocks are then more densely populated in relatively recent time than in relatively ancient time. The captures can in this case be stored regularly in memory, but the processing then selects the data in the irregular way to improve processing efficiency.

The method can further comprise recording additional blocks of data samples of the satellite broadcast in response to the request for a position determination, thereby forming the most recent block of data samples. This means a block of samples is taken as close to the desired timing as possible.

After obtaining a position fix, re-attempts can be made for the unsuccessful attempts using the additional information of the successful attempt. This can enable a position fix to be obtained where it was previously not possible.

Position fixes can be obtained for times before the obtained position fix, thereby to form a position trail.

The method can further comprise processing blocks of data samples taken after the particular time to assist the attempt to obtain a position fix at the particular time. Thus, information obtained after the time of the desired position fix can be used to assist in the position fix. This is of course of interest for a position fix at a particular time in the past, rather than for a desired current position indication. There are applications where such historical information is desired, for example the position of an item (for example a shipment container) at a particular time while it was in cargo.

The method can further comprise recording additional blocks of samples in response to a trigger event. This can be used to enable additional position fixes at times when it is likely that a position fix may be desired. This can act as a pre-emptive measure to increase the chance of obtaining a position fix at a time which is expected to be imminent. Furthermore, additional blocks of samples can be taken when the GPS environment is expected to be favourable for obtaining a position fix, and not only because a position fix is expected to be imminent. For example, an indication that there is movement outdoors is a good indicator that a GPS would be successful, and would be an opportunity to provide a last known position fix before a user goes indoors.

The trigger event can comprises an indication from a sensor of one or more of:
 detection of motion;
 a temperature change;
 a sound profile change;
 a light profile change;
 a change in signal received from a cellular base station.

The recording and the processing can take place on a portable battery operated device. For example this may be a data logger to be provided with a container during shipment, so that a history of the location can be obtained, and a request for a current location can be answered.

Alternatively, the recording can take place on a portable battery operated device and the processing can take place on a separate device onto which data from the portable device is downloaded. This means the portable device does not need the processing capability to process the samples. An example may be a camera. In response to each request for position (when a photograph is taken) the preceding history of data can be made to follow the irregular pattern so that the subsequent position fix attempts are made with the most efficient use of processing capability.

Thus, in one example, the request for position determination corresponds to the timing of the capture of an image or a sequence of images, and the recording takes place on a camera. In another example, the request for position determination comprises a request from an external controller, and the recording and the processing takes place on portable data logger device.

The invention can be implemented as a computer program.

The invention also provides apparatus for determining a location of an event of interest by processing signals from a satellite positioning system, the apparatus comprising:
 first receiving means, adapted to periodically record blocks of data samples of a satellite broadcast;
 a processor which is adapted:
  in response to a request for a position determination at a particular time, to process a most recent block of data samples in an attempt to obtain a position fix,
  if the attempt to obtain a position fix is unsuccessful, to process blocks of data samples which were recorded further back in time in a sequence to make further attempts to obtain a position fix, until a position fix is obtained,
 wherein the blocks of data samples used for the further attempts relate to time instants which are irregularly spaced before the particular time.

It is noted that this irregular population of captures may only extend back a certain time before the request time. For example, captures with this irregular timing can be used before the request time, but also before a previous time point relating to a trigger event, as explained above.

BRIEF DESCRIPTION OF THE DRAWINGS

The invention will now be described by way of example with reference to the accompanying drawings, in which.

DETAILED DESCRIPTION OF THE INVENTION

The invention provides a method of determining a location in which a most recent block of data samples is processed in an attempt to obtain a position fix. If this is unsuccessful, blocks of data samples which were recorded further back in time are processed in a sequence to make further attempts to obtain a position fix, until a position fix is obtained. The historical blocks of data used are irregularly spaced over time, such that the data samples used are more densely populated in relatively recent time than in relatively ancient time.

The invention can be used in full function GPS receivers or in capture and process later applications. However, in each case, the device implements a form of capture and process later functionality, in that data captures are stored for future use in obtaining a position fix.

In a typical capture and process later application, a small capture device which stores short "captures" of IF data samples into memory can subsequently upload its IF data captures to a shared central computer which would not only carry out the necessary signal processing (correlation etc), but would also have access to a database of recent satellite information (ephemeris etc) by being connected to one or more conventional GPS receivers which relayed key parts of the GPS data message they received to the central computer.

Figure 1:
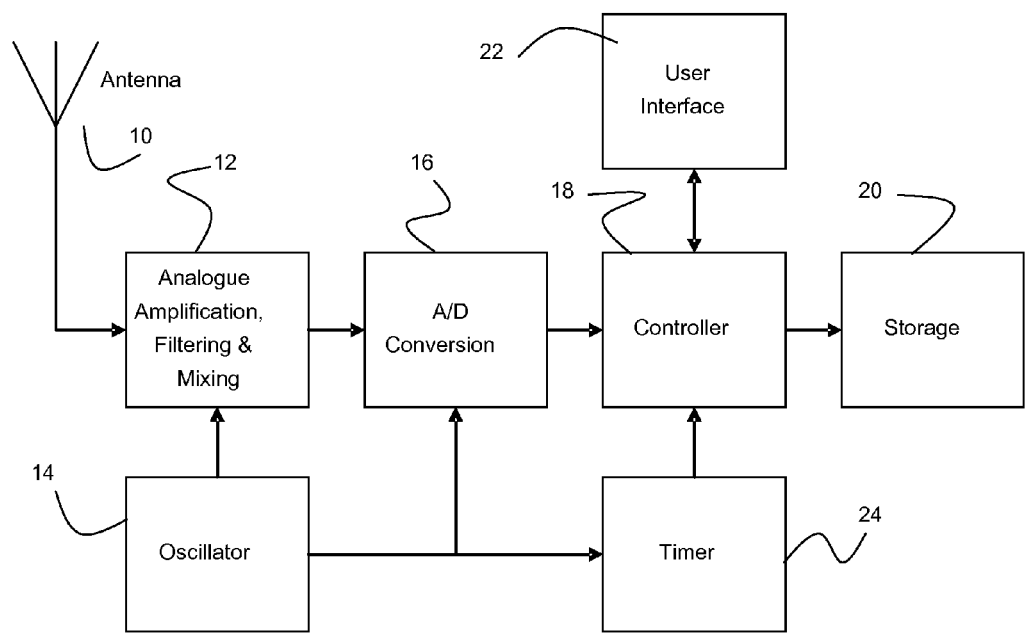
FIG. 1 shows a GPS receiver suitable for Capture and Process Later operation and which can be used to implement the invention.

FIG. 1 is a system diagram of a Capture and Process Later GPS system. The signals from the GPS satellites are received by the antenna 10 and then put through conventional analogue processing, typically comprising a combination of amplification, filtering and down mixing in unit 12 driven by a reference oscillator 14 (normally a temperature compensated crystal), followed by ND conversion in unit 16. This is the conventional radio receiver electronics forming the RF front end.

A controller 18, implemented as discrete logic or a micro processor with associated firmware, selects portions of the sampled IF data generated by the RF front end to be stored in the storage device 20, for example a flash RAM, hard disc etc. The manner in which it does this is influenced by settings from the user (as input by the GUI 22) and the use of a timer 24 which can also be driven by the oscillator 14 as shown.

The timer 24 can be as simple as a counter driven by the oscillator, or it could be a real-time clock (RTC) which keeps date and time even when the device is otherwise turned off. It may have a separate oscillator to minimise "off" energy usage.

When activated, the device records short blocks of IF data from the RF front end (these short blocks are termed "captures" in the following description) along with an associated timestamp from the timer 24. These captures may be for example 100 ms long and they could be recorded at regular intervals, for example once every 10 s. Typically, the RF front end provides a stream of samples at a rate of 6 MHz, and a capture comprises the 100 ms (or 200 ms for example) data of that stream (i.e. 0.6 or 1.2 million samples). The exact values used could be varied explicitly or implicitly by the user via the GUI 22. In different applications, different length captures will be appropriate. Typically, each capture will be shorter than the subframe duration of 6 s, and preferably less than 500 ms.

Preferably, energy consumption in the periods between captures is minimized by turning off as many components of the GPS receiver as possible. A minimal set of components, including the timer 24, remain active, in order to "wake" the receiver at the time of the next capture. The device can thus be implemented as a battery operated portable device, and the battery life can therefore be extended.

In a purely capture and process application, any position determination is obtained by connecting the device to a computer to upload the recorded data captures. In an application in which the device is provided with full GPS functionality, the system also includes the required processing capability to obtain a position fix from the samples, either recorded or in real time.

This invention relates to a system in which a log of captures (by "capture" is meant a recorded block of GPS IF samples) of position-related information are received and stored in case they are of use later to contribute the estimation of a position fix. Thus, additional captures are used to those which are obtained at the time of the desired position fix. The timings of the additional captures used is not regular, but is selected so as to provide a balance between the number of additional captures which need to be processed (which should be kept low to reduce power consumption), and the chances of then being able to obtain a position fix when this was not previously possible (which should be high).

The captures are initially received and stored at regular intervals (although with the option of triggered additional captures as explained in more detail below). The interval will depend on the application, in particular the expected speed at which the device is moving, and the required accuracy of the position. For example, for tracking the delivery of goods over a long road journey, periodically sampling every 5 minutes will be adequate, to know where the consignment is. For tracking the path followed by a motorcycle around a course, a capture every second may be more appropriate. The captures are stored, together with an indication of the time at which they were received.

Taking the example of a capture every second, although captures may be taken every second, all of these will not be used to assist in a position fix. In an application where a real time position request can be provided, the captures to be kept can follow a desired pattern leading up to the current point in time. Thus, some of the captures can be selectively overwritten. By way of example, a set of captures may maintained be at spaced intervals back from the current point in time, for example:

Every second for the last 10 s
Every 10 s for the last 100 s
Every 100 s for the last 1000 s etc.

If a GPS fix request is not received then the unwanted captures are then progressively discarded. This mode of taking captures and progressively overwriting them can be a distinct and recognisable GPS standby mode, enabled by the user or the application It can be seen from the example above that the captures which are kept are more densely populated in relatively recent time than in relatively ancient time. There may be as few as two different rules—so that there is one period of high density of captures, and the remainder of time has the same lower density of periodic captures. In this case, there will be a first period of time immediately before the time of interest with a first time-density of captures, and a second immediately preceding period of time with a lower second time-density of captures. There may be three or four such periods of time with successively reducing time-densities. The first time period will have captures at the nominal (i.e. maximum) periodic rate at which captures are made.

Instead of discrete time periods, the pattern may follow a more complicated exponential decay of capture density.

The captures are preferably annotated by a time stamp, but also by any trigger information, so that the processing selection or storage retention selection can preferentially use such captures. For processing selection (or communication over a link as explained below) such annotations would be communicated from the capture device to the processing platform.

More generally, when recording a capture, various attributes can be recorded along with the IF data, including:
 (i) Date & time (in a known time system)
 (ii) Identifier for, or values of, the RF front end characteristics (such as sample rate, centre frequency, oscillator type/attributes etc.)
 (iii) Data format (endianess of data, ordering of bits when there is more than 1 bit per sample, complex/real notation)
 (iv) Identifiers for device model (or even a unique device ID)

Figure 2:
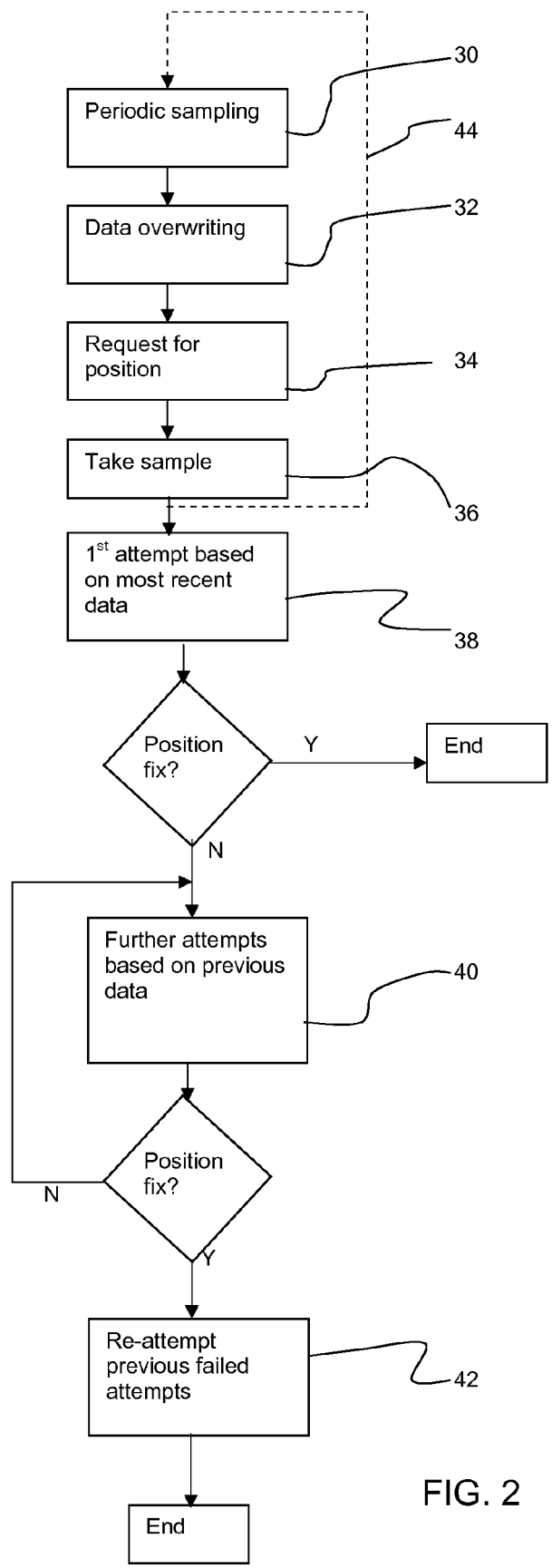
FIG. 2 shows an example of method of the invention.

FIG. 2 is a flowchart showing how this approach is used to obtain a position fix in one example of the invention in which the device has full GPS functionality.

In step 30, there is periodic sampling of blocks of IF GPS samples, for example of 200 ms duration and 1 s interval (as an arbitrary example). In one example, the memory capacity is not adequate to store all captures for a given period of operation, so there is data overwriting in step 32, which results in an irregularly timed set of stored data captures and timing values.

In step 34 there is a request for position. This can optionally give rise to a further GPS sampling shown in step 36 so that one GPS capture is at the correct time. Alternatively, the most capture can instead be used.

In step 38, a position fix is attempted by the device based on the most recent capture. A-GPS information (satellite "ephemeris") may be provided by the system to enable the position fix attempt based on historical GPS samples. If this first attempt is successful, the method ends (and returns to periodic sampling 30). If this first attempt is not successful, there are further attempts using the previous data, and following a sequence backwards in time. Each further attempt is represented by block 40, and an iterative process is followed until the position fix is obtained. This will be possible once a point in time has been reached when the satellites were found, for example because the user was then outdoors at that time.

The irregular timing of captures used means that repeated attempts are not made when it is unlikely that they will be successful. For example, if a position fix is not possible now, 5 s ago, or 10 s ago, it is unlikely that a position fix was possible 15 s ago. Instead, the next captures may be at 1 m ago, 2 m ago etc.

There is then an optional step 42 of re-attempting the previously failed position fixes using additional information which has become available from the successful position fix (i.e. the knowledge of the approximate location and time, which can for example enable the satellites in view to be determined). This may even result in a position fix for the current, requested GPS fix capture which had previously failed.

The process ends and returns to the periodic sampling after the processing has been completed.

In addition to the periodic captures being recorded, additional captures may be recorded in response to a trigger event. These may be collected as a result of an environment, user or external stimulus or change. This is useful in order to detect that the device is likely to be in a different environment (in particular, outside, rather than inside), and therefore that it would be useful to collect a GPS capture. Useful triggers for example include:
 motion detection (from an accelerometer);
 temperature change (devices often contain sensors which measure temperature, directly or indirectly, for example for compensation of the IC analogue circuitry or of the oscillator frequency);
 change in noise level or spectrum characteristics (for devices containing a microphone);
 change in light level or colour balance (for devices containing cameras, or with a simple light sensor);
 changes in the signal received from cellular base stations (signal levels or GSM Timing Advance, in devices with a cellular radio capability);
 changes in the signals received from local communications devices, such as WiFi or Bluetooth;
 changes in broadcast signal levels (such as FM or DAB radio).

The required sensors may be periodically activated, specifically for the purposes of monitoring the position environment, or the activation and usage of these sensors may be part of the normal usage of the device, and they may simply be additionally monitored for the purpose of detecting an environment useful for gathering positioning information.

These triggers can be used to take additional blocks of samples when the GPS environment is expected to be favourable for obtaining a position fix, or because a position fix is expected to be imminent. For example, an indication that there is movement outdoors is a good indicator that a GPS would be successful, and would be an opportunity to provide a last known position fix before a user goes indoors.

Other sensor information may be gathered, in addition to GPS (for example the visibility of WiFi base stations) in order to assist in the estimation of the requested fix location.

The position fix provided may be supplemented with an estimate of its uncertainty, for example related to the last known position, its uncertainty, and the possible range of movement since then.

In some applications, a history of movement may be desired in addition to the position at the time of the request. Thus, further previous captures may be processed to show a trail of the history of position, prior to the position request.

The approach described above relates to a real-time application in which full GPS functionality is provided, for example in a consignment tracking device. The approach can equally be applied in a purely Capture and Process Later device, such as a camera, in which the processing all takes place at some later time.

In this case, in step 34, when a GPS fix is requested, a capture is made and stored (step 36) for subsequent processing. The overwriting of data then takes account of the position request, so that the desired irregular pattern extends back from that point time, as well as from any subsequent points in time with further requests for position. The method then returns to the periodic sampling as shown by dotted arrow 44.

In this case, however, a set of data captures can be collected with irregular timing following the fix request event. The data overwriting 32 then maintains captures with an irregular timing before and after the desired position fix. The patterns before and after can follow the same rules, or different rules. For example, captures may be kept 1, 10, 100, and 1000 seconds after the GPS fix request.

In the capture and process later example, the data captures, together with other information to assist in later processing, such as the frequency plan used, are at some point transferred to another device or service for processing. This external device or service then implements steps 38, 40 and 42 of FIG. 2, but it can progressively work both backward in time and forward in time until a successful nearby fix is achieved.

In both types of system (full GPS, or capture only), a position at the point of the requested GPS capture can be estimated not only based on the use of the neighbouring position fix, but it can also use interpolation methods.

To give examples of applications where the two different approaches may be used, two simple examples are presented for illustration:

(i) A Cellular Tracking Device

This is a portable battery operated device which receives GPS signals and stores captures every 5 minutes (without processing them). It has a cellular telephony receiver and transmitter for communication to an external device.

A request to report the location can be received from a communication message over a cellular network, or as a result of a locally detected change in the circumstances, such as motion or other indication of possible hazard.

The cellular network then provides the tracking device with the current satellite ephemeris orbit information, so that the short GPS captures can be used to obtain a position fix. The device then optionally takes a fresh GPS capture (as explained above) and attempts to calculate its position. The position obtained by the method explained in detail above is then reported to the cellular network.

(ii) A Camera

This is an example of device which preferably does not have the full GPS functionality, so that costs can be kept down. The device receives and stores data captures, whenever a photograph is taken and also periodically, for example every 5 minutes. The data is uploaded together with the picture images to a service which processes the captures and produces a fix.

The service processes the captures recorded with each photograph. This position fix obtained, using captures before and after the timing of the photograph as explained above, is then assigned to the photograph.

The principles can however be applied to any GPS device, including dedicated GPS/GSM tracking devices, GPS phones, cameras, video cameras.

The processing required to obtain a position fix based on GPS samples is conventional. It essentially involves a search of the IF samples for the signals of as many SVs as possible, followed by estimation of the time of flight of those signals and trilateration to derive a position. At this stage, the downloaded ephemeris data can be used to guide the search. For example, knowing the request time and the positions over time of each SV, only certain SVs would be visible to a receiver in a given position. Thus, once a signal corresponding one of the SVs is found, a number of other SVs which could not simultaneously be visible can be eliminated from the search.

There are additional possibilities of combining the captured GPS measurements with cellular information (base stations, frequency measurement, timing advance), as part of the processing to obtain position fix.

In the example above, the memory capacity is finite and there is overwriting in order to arrive at the irregular pattern of data captures. However, the invention can also be applied to a system in which the memory capacity is more than required to keep all captures, for a given period of use of the device (for example the full length of a journey for the tracking device). The invention can still be applied in that the processing of the stored captures to obtain a position fix then follows the rules explained above. Thus, the captures are selected for processing in the manner explained above, rather than the memory only containing those captures.

As explained above, there are two basic alternative schemes: a) the captures being stored, but those not needed being overwritten later, and b) the captures all being stored by the device, but only some of them being processed.

Either approach may involve the processing of the captures in a non-sequential manner, particularly after the first fix has been achieved. For example, starting from capture X closest to the request time, the algorithm can go back in time to process previous captures, for example X-1, X-2, X-4, X-8, X-16 etc. until for example capture block X-16 gives a fix. This is then used as a last known position.

The processing can run forwards again. This may use the same pattern X-8, X-4, X-2, X-1, X which might well succeed (as X-16 was successful, the approximate starting position for X-8 is known, so the search and fix for X-8 is more likely to be successful), so that X can after all be found. Even if not, then perhaps X-8, and X-4 are successful, giving a closer last known position fix than X-16

This can be done using the same pattern/selection so that there is the processing of captures out of sequence. Furthermore, in the second option b), a different pattern can be used in the position fix refinement once a first fix has been found, for example after a successful X-16, then X-14, X-12, ... X-2, X, or even iteratively converging search patterns can also be processed to arrive at the fix X or the latest last known position for which a GPS fix can be found. This iterative convergence involves successively moving in time backwards and forwards, with successively different and finer capture patterns/selections.

The same can apply with later fixes, after the request event, for the next known position, or for iterative convergence using interpolation between last and next position.

In the case of b), with processing selection, there is a step of analysis of the captures available (taking into account the capture metadata of timestamps and any trigger information) and an appropriate selection of candidate captures. This processing step may be repeated as the analysis progresses.

In the examples in which the position fix processing is carried out externally to the capture device, there may be limited bandwidth for the communication (either of a real time telemetry link or of a USB data upload connection) between the capture device and the processing platform. In this case, in the example b), the data may all be stored in the device, but only a subset (X, X-1, X-2, X-4, X-8, X-16) communicated across the limited bandwidth communications path to be stored on the platform and processed. This then cuts down the time-to-result, which is limited by the communications time in this case.

In this approach, the capture metadata (timestamps and triggers) could initially be communicated to the processor, and this metadata would be used to perform the selection of which captures are communicated across the bandwidth-limited link and processed.

As explained above, in a most basic implementation, the captures are taken regularly, and those used for processing are irregular back in time from a position request.

However, at an arbitrary point in time, the irregular capture density may not be present—for example before a finite size memory is full, or during overwriting. This depends on what order the data is overwritten. If some of the recent data has been overwritten, but the later data hasn't been overwritten yet, then peculiar patterns will occur during the overwriting process. However, the pattern will tend towards the desired pattern of higher density near the request time and lower density beforehand.

In addition, the use of additional triggered captures alters the data pattern that is kept or is processed. Thus, the irregular pattern of higher density near the request and lower density further back in time may not extend back fully in time. There may for example be another triggered capture, immediately before which the capture density is high again, and further back in time, the capture density is low again. Thus, the high density and low density population of captures may relate only to a localised time period, but is part of a larger overall irregularity which is dynamic (in response to trigger events or position fix requests) and intelligent.

The two examples of full function GPS (with ephemeris assistance) or a capture and process implementation (with IF data uploaded for processing) have been described, but there can be implementations between these two extremes. An example is a so-called Assisted-GPS solution that processes as far as pseudo-ranges and then uploads them to a server which has the ephemeris and can perform the position fix.

In all the different forms outlined above, the method requires very little power consumption, as only the GPS signal samples are captured, and normally these are not processed. The GPS radio needs to be turned on, to receive the GPS signal—but this is much less than the energy that would be needed to carry out the signal processing in order to recover and measure the GPS signals themselves, and hence calculate a position fix.

Importantly, processing energy is only consumed if a position fix is requested.

The additional captures may also be used to provide a trail of the history trail of the device position (as explained above) and this is at no extra cost of components or of energy consumption in the device. Thus, the invention is particularly appropriate for long battery life devices, with an occasional or alarm query of location.

The invention has been described in connection with (single frequency) GPS, but other GNSS systems (GLONASS, Galileo etc) would be similar. Indeed the techniques could also be applied to multiple frequency systems.

Only one schematic outline of the system configuration has been given. It will be appreciated by those skilled in the art that the invention can be implemented simply as a change in the data which is kept in memory (in the case of a memory overwriting version) or as a change in the selection of data to be processed. Each of these changes in functionality can be implemented with completely standard hardware, and with changes in software which will be routine. Thus, the system configuration has not been described in detail and many different versions are possible.

Various other modifications will be apparent to those skilled in the art.

The invention claimed is:

1. A method of determining a location of an event of interest by processing signals from a satellite positioning system, the method comprising:
   periodically recording, in a storage-device, blocks of data samples of a satellite broadcast, wherein said blocks of data samples are generated by an RF front end of a portable battery-operated device;
   in response to a request for a position determination at a particular time, processing, using a processor, a most recent block of data samples in an attempt to obtain a position fix,
   wherein if the attempt to obtain a position fix is unsuccessful, the method further comprises processing, using the processor, blocks of data samples which were recorded further back in time in a sequence to make further attempts to obtain a position fix, until a position fix is obtained successfully,
   wherein the blocks of data samples used for the further attempts relate to time instants which are irregularly spaced before the particular time.

2. The method of claim 1, wherein the blocks of data samples are more densely populated in relatively recent time than in relatively ancient time with respect to the particular time.

3. The method of claim 2, wherein the recording blocks of data samples comprises writing blocks of data samples to a memory until it is full, and then overwriting selected blocks of data samples, such that the stored blocks of data samples are more densely populated in relatively recent time than in relatively ancient time.

4. The method of claim 2, wherein the processing of blocks of data to make further attempts comprises using stored blocks of data samples which are more densely populated in relatively recent time than in relatively ancient time.

5. The method of claim 1, further comprising recording additional blocks of data samples of the satellite broadcast in response to the request for a position determination, thereby forming the most recent block of data samples.

6. The method of claim 1, wherein after successfully obtaining a position fix, re-attempts are made for the unsuccessful attempts using the additional information of the successful attempt.

7. The method of claim 1, further comprising obtaining additional position fixes before the successfully obtained position fix, to form a position trail.

8. The method as claimed in claim 1, further comprising processing blocks of data samples taken after the particular time to assist the attempt to obtain a position fix at the particular time.

9. The method of claim 1, wherein the recording takes place on the portable battery operated device and the processing takes place on a separate device onto which data from the portable device is downloaded, wherein the downloading is of the most recent block of data samples and the data samples for the further attempts, which together comprise a subset of the recorded blocks of data samples.

10. The method of claim 1 further comprising recording additional blocks of samples in response to a trigger event.

11. The method of claim 10, wherein the trigger event comprises an indication from a sensor of one or more of:
    detection of motion;
    a temperature change;
    a sound profile change;
    a light profile change;
    a change in signal received from a cellular base station.

12. The method of claim 10 or 11, further comprising recording information concerning the trigger event with the associated block of samples.

13. The method of claim 12, wherein the processing blocks of data samples which were recorded further back in time is carried out in an order which is dependent on the information concerning the trigger event.

14. The method of claim 1, wherein:
    the recording and the processing takes place on the portable battery operated device.

15. The method of claim 1, wherein:
    the request for position determination corresponds to the timing of the capture of an image or a sequence of images, and the recording takes place on a camera, or the request for position determination comprises a request from an external controller, and the recording and the processing takes place on portable data logger device.

16. The method of claim 1, wherein the samples comprise intermediate frequency downconverted data samples.

17. A computer program embodied on a computer readable storage medium, comprising computer program code which when executed by a computer performs the steps of:
periodically recording, in a storage-device, blocks of data samples of a satellite broadcast, wherein said blocks of data samples are generated by an RF front end of a portable battery-operated device;
in response to a request for a position determination at a particular time, processing, using a processor, a most recent block of data samples in an attempt to obtain a position fix,
wherein if the attempt to obtain a position fix is unsuccessful, the program further comprises processing, using the processor, blocks of data samples which were recorded further back in time in a sequence to make further attempts to obtain a position fix, until a position fix is obtained successfully,
wherein the blocks of data samples used for the further attempts relate to time instants which are irregularly spaced before the particular time.

18. Apparatus for determining a location of an event of interest by processing signals from a satellite positioning system, the apparatus comprising:
first receiving means, adapted to periodically record blocks of data samples of a satellite broadcast;
a processor which is adapted:
in response to a request for a position determination at a particular time, to process a most recent block of data samples in an attempt to obtain a position fix,
if the attempt to obtain a position fix is unsuccessful, to process blocks of data samples which were recorded further back in time in a sequence to make further attempts to obtain a position fix, until a position fix is obtained,
wherein the blocks of data samples used for the further attempts relate to time instants which are irregularly spaced before the particular time.

* * * * *